United States Patent [19]
Wachinski et al.

[11] Patent Number: 5,582,722
[45] Date of Patent: Dec. 10, 1996

[54] CONTINUOUS SELF-CLEANING FILTRATION UNIT

[75] Inventors: Anthony M. Wachinski, The Woodlands; Yongming Xia, Houston; Jaime Bengoechea, Galveston, all of Tex.

[73] Assignee: Ashbrook-Simon-Hartley Corporation, Houston, Tex.

[21] Appl. No.: 357,284

[22] Filed: Dec. 13, 1994

[51] Int. Cl.⁶ .................................................. B01D 24/46
[52] U.S. Cl. .......................... 210/189; 210/268; 210/274; 210/290
[58] Field of Search ................... 210/792, 807, 210/189, 268, 274, 279, 285, 286, 290

[56] References Cited

U.S. PATENT DOCUMENTS

| | | | |
|---|---|---|---|
| 612,151 | 10/1898 | Bell . | |
| 1,007,929 | 11/1911 | Deacon et al. . | |
| 1,123,704 | 1/1915 | Deacon et al. . | |
| 1,130,382 | 3/1915 | Deacon et al. . | |
| 1,620,431 | 3/1927 | Bramwell . | |
| 1,861,295 | 5/1932 | Bramwell . | |
| 2,057,887 | 10/1936 | Elliott et al. | 210/141 |
| 2,348,854 | 5/1944 | Schreiber . | |
| 3,382,983 | 5/1968 | Stewart | 210/266 |
| 3,598,235 | 8/1971 | Demeter | 210/189 |
| 3,694,106 | 9/1972 | Walker | 417/109 |
| 3,715,868 | 2/1973 | Biasi | 55/315 |
| 3,814,254 | 6/1974 | Schatz | 210/169 |
| 3,985,522 | 10/1976 | Kuhlmann | 55/52 |
| 4,060,484 | 11/1977 | Austin et al. | 210/189 |
| 4,060,574 | 11/1977 | Verner et al. | 261/77 |
| 4,107,240 | 8/1978 | Verner et al. | 261/77 |
| 4,126,546 | 11/1978 | Hjelmner et al. . | |
| 4,197,201 | 4/1980 | Hjelmner et al. | 210/189 |
| 4,427,505 | 1/1984 | Stevens | 204/109 |
| 4,558,990 | 12/1985 | Roach | 417/54 |
| 4,645,427 | 2/1987 | Stevens | 417/108 |
| 4,701,107 | 10/1987 | Dickinson et al. | 417/86 |
| 4,720,347 | 1/1988 | Berne | 210/189 |
| 4,787,987 | 11/1988 | Hensley | 210/792 |
| 4,891,142 | 1/1990 | Hering, Jr. | 210/792 |
| 5,173,194 | 12/1992 | Hering | 210/189 |
| 5,277,829 | 1/1994 | Ward | 210/807 |
| 5,454,959 | 10/1995 | Stevens | 210/792 |
| 5,462,654 | 10/1995 | Hering | 210/268 |

FOREIGN PATENT DOCUMENTS

| | | |
|---|---|---|
| 263183 | 8/1913 | Germany . |
| 449431 | 10/1927 | Germany . |
| 578811 | 7/1946 | United Kingdom . |
| 94/22547 | 10/1994 | WIPO . |

OTHER PUBLICATIONS

Parkson Corporation/"DynaSand Filter"/1980.

*Primary Examiner*—Ivars Cintins
*Attorney, Agent, or Firm*—Foley & Lardner

[57] ABSTRACT

An improved vertical filtration unit includes a bell-shaped lower end for the air-lift tube, an injection ring for introducing air into the air-lift tube at a considerable volume, and a washbox with a more efficient scrubbing arrangement for washing dirt particles from the filtration material. The bell-shaped lower end makes the transporting of a mixture of dirty filtration material and water to the top of the filtration unit more efficient than with the conventional straight tube bottom. The tube receives compressed air from two horizontally positioned inlets positioned 180° from each other. The flat and round target plate makes the scrubbing of filtration material more efficient, while a baffle prevents the filtration material from being ejected from the washbox.

12 Claims, 2 Drawing Sheets

CONTINUOUS SELF-CLEANING FILTRATION UNIT

BACKGROUND OF THE INVENTION

This invention relates to an improved method and apparatus for filtering water or wastewater containing suspended solids. The present invention, more specifically, is an improvement over prior art systems for filtering these kinds of wastes. While water and wastewater are referred to as the waste or material to be filtered free of particulates or suspended solids, the present invention is not so limited in use. It effectively treats many other liquid industrial effluents and slurries.

Typical prior art vertical filtration units are disclosed and explained in U.S. Pat. No. 4,060,484, to Austin et al. and U.S. Pat. No. 4,891,142, to Hering, Jr., both of which patents are herein incorporated by reference. The water/wastewater undergoing filtration in these systems moves downward, due to the force of gravity, through the filter media. The filter media, containing different sized grains or particles, usually sand, is dirtied by the suspended solid particles it removes from the water/wastewater undergoing treatment. By the time the water/wastewater reaches the bottom of the filtration chamber, it has been filtered free of suspended solid particles. These solid particles are then carried by the filter media, from which they must be removed.

A mixture of a portion of the filtered water, the now dirtied filter media at the bottom of the filter unit and a small amount of filtered water are then air lifted to a washbox. This lifting is carried out by an air-lift tube equipped with a compressed air supply. The mixture of filtered water, filtration sand, and suspended solids is directed against a baffle or plate, to scrub the suspended solid particles from the sand.

The washed sand is returned to the top of the filter media bed. The suspended solid particles, washed from the filter media, are flushed from the filter by a combination of filter influent and filtered water that carry out the suspended solids across a reject weir.

The filtered water collects inside an internal cylindrical screen at or near the bottom of the filtration unit, from which it is drawn. The filtration cycle automatically repeats itself with the influx of a new supply of water/wastewater to be filtered.

Prior art continuous systems for the filtration of water/wastewater and the removal of suspended solid particles are typically not as effective or efficient, however, as industry and the public need and desire. Standard filtration systems can be effective, i.e., they provide high filtration rates. Even so, they are not as efficient as the present invention. They require pumps and must be taken off-line to clear the dirtied filtration material.

Many of these and other-shortcomings in prior art vertical filtration systems are met by such patented systems as that disclosed in the above-cited Hering, Jr. patent. The present invention, however, provides even further advantages and benefits.

Accordingly, it is an object of this invention to provide an apparatus and process for filtering water/wastewater more efficiently than can be done with presently available air-lift systems.

It is a further object of the present invention to provide a vertical filter, in which the filtering material is constantly and more efficiently circulated and cleaned.

It is still another object of the present invention to provide a vertical flow particulate filtering system that operates as economically as possible, with no moving mechanical parts to malfunction or otherwise require maintenance or replacement.

Other objects and advantages will become apparent from the drawings and specification that follow.

SUMMARY OF THE INVENTION

In the filtration unit of the present invention, water/wastewater is filtered by its downward gravitational flow through a conically shaped bed of different sized filtration material, usually but not necessarily sand. The filtration sand removes suspended solid particles from the water/wastewater.

The dirtied filtration sand is then air lifted to the top of the filtration unit. The air-lift tube has a bell-shaped bottom that increases the pumping rate. Thus, more filtered water, sand and dirt can be pumped to the top of the filtration unit without increasing the air supply requirements of the air pump. Furthermore, the bell-shaped bottom affords an easy re-start of the air-lift tube after the air has been turned off.

Air is injected into the air-lift tube through an air injection ring having horizontally opposed air injection nozzles. Horizontally opposed air injection nozzles increase the efficiency of pumping, that is, more sand can be pumped without increasing the amount of air.

The dirtied sand is partially cleaned during its travel up the air-lift. The air and water mixture within the air lift tube provides an air/water scouring that separates the dirt from the sand.

The top of the filtration unit includes a washbox for receiving and further scrubbing the dirtied sand to wash away remaining solid particles. This "washing away" operation uses only a small amount of filtered water.

The washbox includes a target plate and a vertical baffle. The target plate efficiently separates the suspended solids from the sand and water suspension.

The baffle plate efficiently prevents the ejection of sand from the washbox. Use of the target plate, therefore, increases the cleaning power of the sand, resulting in a higher concentration of waste solid particles in the reject stream. The scrubbed filtration sand is returned through openings in the washbox to the top of the conical sand bed, and the filtration cycle continues.

DETAILED DESCRIPTION OF THE PREFERRED EMBODIMENTS

In the following description and accompanying drawings, like reference numbers, as used in the various figures, refer to like features or elements.

The filtration system characterizing the present invention utilizes in combination a unique air-lift and a unique washbox. A specially designed target plate is attached to the top of the washbox. The configuration and positioning of the target plate, in combination with an arc-shaped baffle, prevents sand from being flushed from the washbox while it is being washed free of suspended solid particles. A unique air supply system provides compressed air to the air-lift tube.

Figure 1:
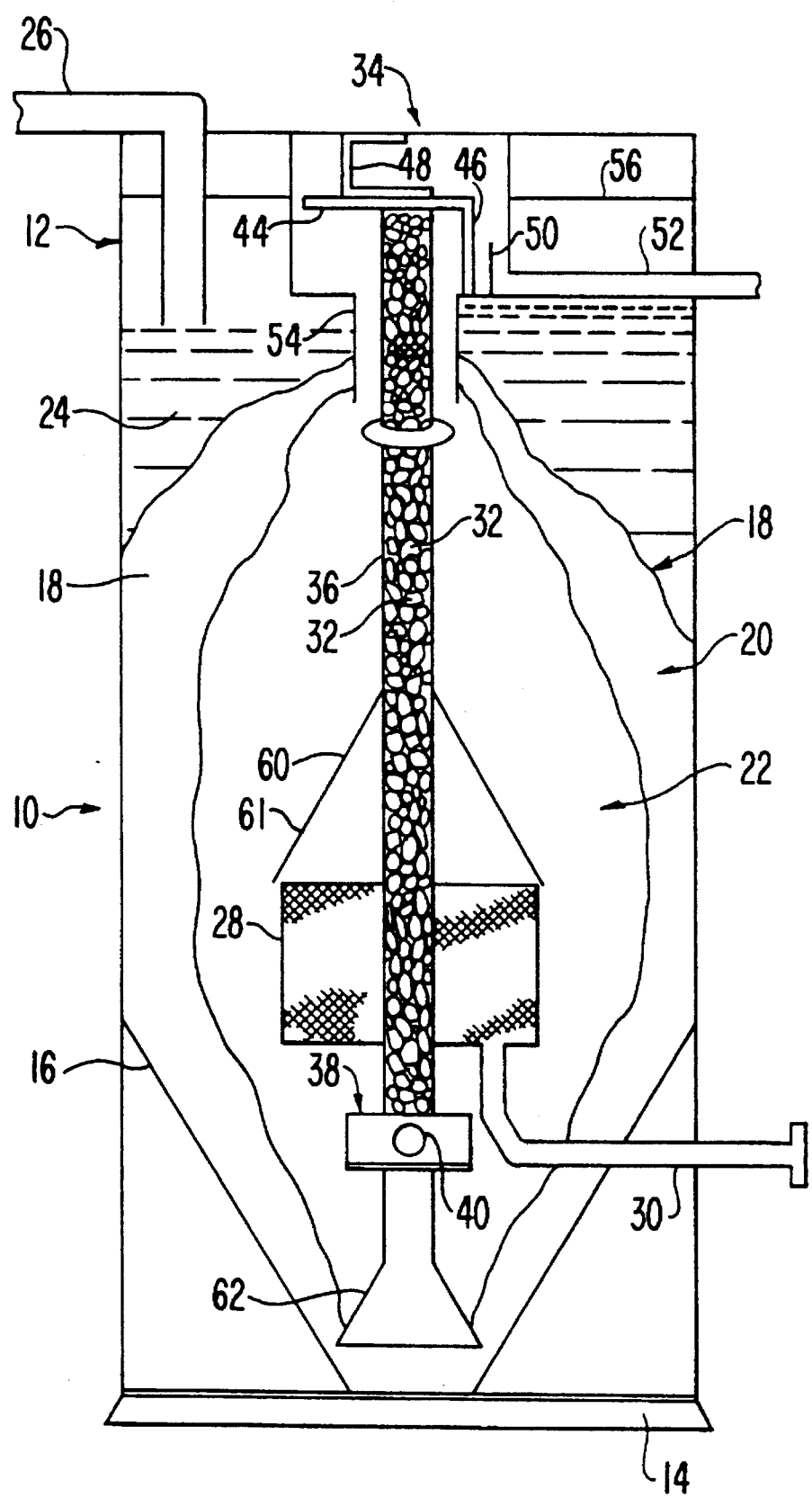
FIG. 1 is an exposed side view of the present invention.

Referring to FIG. 1, filter unit 10 includes a vessel 12. Vessel 12 is defined by a base 14 and a side wall 16. While the vessel 12 is depicted as cylindrical in cross section, it may be square or even have other cross sectional configurations. Vessel 12 contains a bed 18 of particulate filter material, which may be sand or another suitable filtration material.

The generally conical sand bed 18 filters the water/wastewater 24 as it descends downwardly through the sand bed 18. This conical sand bed configuration has proven especially effective for filtration.

Enhanced filtration is accomplished when the bed 18 is formed of two discrete layers of filtration material. In the illustrated embodiment, the bed 18 is formed of discrete concentric layers 20 and 22. A layer of coarser sand 20 overlies a layer of finer sand 22.

The conical configuration of the filtration sand occurs naturally from the operation of the filtration unit. As the sand drops from the washbox onto the top of the conical pile, the particles classify themselves. The larger sand particles tend to roll down the slope of the cone. The smaller particles, however, tend to descend vertically through the interior of the cone portion containing the larger particles. Without resort to any human or mechanical intervention, therefore, the pile retains its conical configuration.

The filtration process begins with the entry of water/wastewater 24 into the vessel 12 through water/wastewater intake 26. The water/wastewater descends, due to gravity, through the conical filtration bed 18 toward the bottom of the filter.

The unfiltered water/wastewater 24 tends to flow through the coarser outer layer 20, rather than through the finer inner layer 22. Water, like any liquid, flows through the path of least resistance. The path of least resistance in this case is through the coarser filtration sand 20, because the spaces between its particles are larger than the spaces between the particles of the finer filtration sand 22. Thus, the initial filtration of water/wastewater 24 is accomplished initially by the coarse filtration sand layer 20.

The partially filtered water/wastewater is further filtered as it next flows through the interior layer of finer particles 22 to the filtrate screen enclosure 28. The now filtered water/wastewater leaves the filter unit through the filtrate line 30.

As part of the continuous filtration process, dirtied sand particles 32 from the bottom of the filter are pumped to a washbox 34 at the top of the filter unit 10. A small amount of filtered water/wastewater that does not flow into the screen enclosure 28 serves as a transport medium for the sand to be pumped upwardly through the air lift tube 36. The washbox 34 includes components that enable the filtered and air-lifted water, together with a small stream of influent water/waste water 24, to further wash the filtration sand free of particles and flush these particles from the filter.

The continuous transport of dirty sand from the bottom of the filter to the washbox is carried out by the air lift tube 36. The superior performance of the filter unit depends in great part on the performance of the air lift. Air lifts themselves are well known in the fields of wastewater treatment and well hydraulics.

A conventional air lift pump consists essentially of a vertical tube having its lower end submerged in the liquid or slurry to be pumped. The upper end of the tube discharges the pumped material. In the case of the present invention, the upwardly transported mixture of dirty sand and filtered water empties into the washbox 34. The height to which the mixture can be air-lifted depends on the efficiency of the air lift system.

The actual pumping or lifting action is achieved by the introduction of air into the lower part of the air lift tube, which also contains a mixture of filtered water and dirty sand. The resultant mixture is lighter (less dense) than the liquid in which the lower end is submerged. The upwardly directed pressure of the column of liquid in the base of the air lift tube, combined with the decreased specific gravity of the air-entrained mixture inside the air lift, forces the mixtures of dirty sand and filtered water upward.

Figure 2:
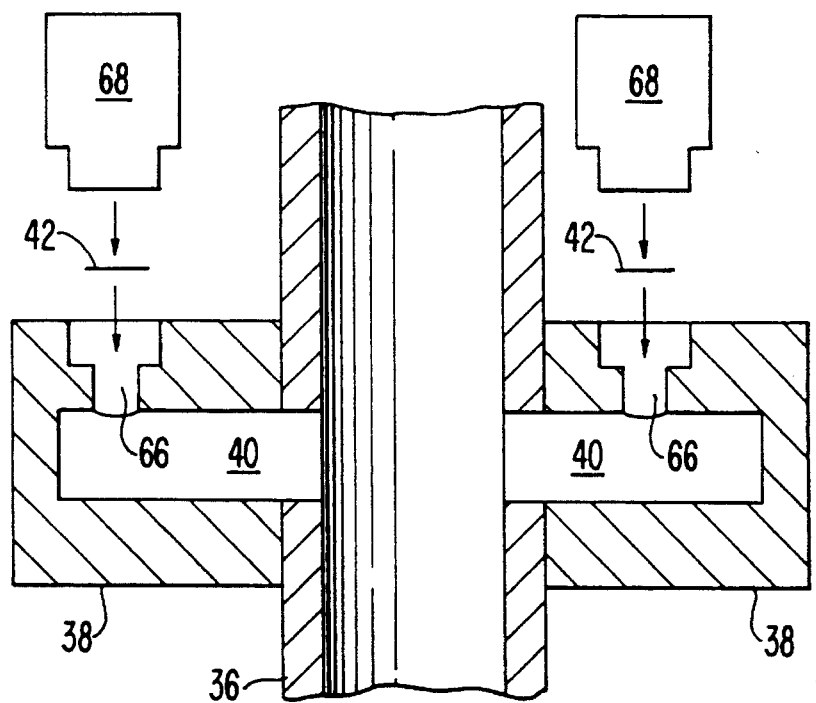
FIG. 2 is an exploded cross-sectional view of the air supply inlets to the air-lift tube of the present invention.

As shown in FIGS. 1 and 2, compressed air is introduced into the air lift tube 36 near its bottom through an annular air injection ring 38. Ring 38 communicates with the interior of the air lift tube through passages 40. Compressed air is supplied to the interior of the ring 38 through nozzle openings 66. Compressed air connectors 68 are inserted into the nozzle openings 66 in the air injection ring 38. The compressed air connectors 68 are connected to a compressed air line (not shown) which communicates with a source of compressed air (not shown). A screen 42 may be inserted into the bottom of the nozzle opening 66.

In order to maximize the air-flow rate to a mixture being air lifted to washbox 34, two compressed air passages 40 are used. These passages are located opposite each other (180° apart) near the bottom of the air lift tube.

Unlike conventional air lifts, the supply of compressed air used in the present invention can be regulated. Compressed air can be selectively applied through one or both nozzles 66, or one or both of the nozzles may be partially opened.

This selective control of the compressed air supply to the interior of the air-lift tube allows for adjustments in the tube's lifting ability. The particular orientation and number of compressed air inlets add to the efficiency of the air lift operation. More sand is pumped with less air, as a result of a less dense air/water/sand mixture.

Figure 3:
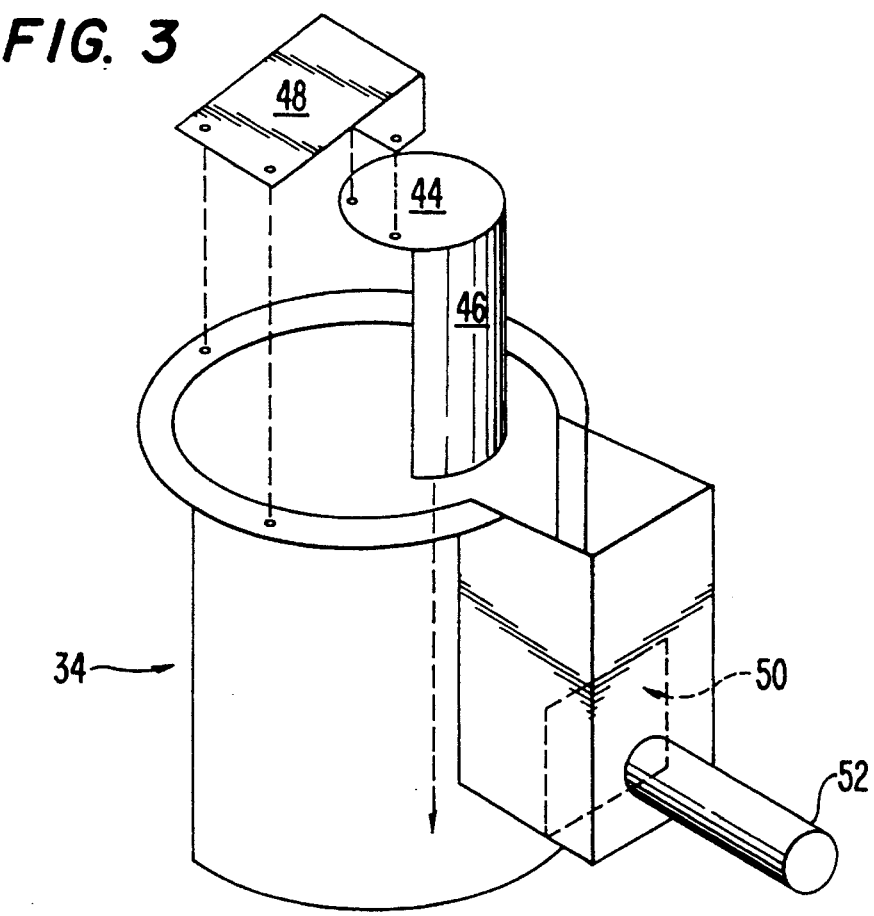
FIG. 3 is an exploded perspective view of the washbox of the present invention affixed to the upper end of the air-lift tube.

FIGS. 1 and 3 illustrate the construction of the washbox 34. The washbox 34 includes a target plate which deflects the filtered water and dirty sand mixture downwardly. This downward deflection efficiently washes dirt particles from the filtration sand.

The target plate 44 is attached to an approximately 120° vertical baffle 46. The target plate 44 and the vertical baffle 46 are contained within the washbox, and held in place by clip 48 attached to the washbox. The vertical baffle 46 prevents sand deflected from the target plate 44 from being directly ejected from the washbox through washbox exit 52.

The shape of the target plate 44 eliminates dead areas in the washbox, where washing of the sand might otherwise be inadequate. The sand particles and filtered water impact against each other within the washbox at high velocities, thus removing dirt particles from the sand. The level of wash water in the washbox is controlled by an adjustable weir 50 (shown in dotted line in FIG. 3).

A small amount of the filtered water, along with a small portion of the influent water/wastewater, exits the washbox through tube 52, transporting with it dirt particles washed from the filtration sand. Most of the water, however, is filtered, flows downward into the filtrate enclosure 28 and exits the filter unit through pipe 30.

The sand or other filtration material is much heavier than the suspended particles, and is not flushed from the filter. Rather, the filtration material exits from the washbox, due to its own weight, through vertically descending tube 54. The newly-cleaned filtration material is returned to the top of the conically shaped filtration bed. Sand that otherwise might be washed from the washbox is blocked by the arc-shaped baffle 46.

The water/wastewater entering the filter unit through inlet tube 26 descends through the filter, as earlier explained. Most of this filtered water exits the filter unit through filtrate screen enclosure 28 to filtrate line 30.

A small amount of filtered water, however, flows to the bottom of the air-lift tube 36, where it mixes with the bottom-most filtration sand. This dirtied sand and filtered water mixture is air lifted to the washbox, where a small amount of filtered water, i.e. the air-lifted water, and a small portion of the influent water/wastewater become wash water for the dirt particles carried by the filtration material, as already described.

Annularly shaped tube 54 surrounds the air-lift tube 36. It provides a path or opening in the washbox for the washed sand to descend to the top of the conical pile of filtration sand.

The unfiltered water/wastewater 24 at the top of the filter unit will assume a particular level which, for purposes of explanation, is designated as level 56 (FIG. 1). The incoming water/wastewater will flow upwardly through tube 54 because the water level in the washbox is at a lower level than level 56.

This upward flow of water/wastewater is substantially blocked from entering washbox 34, however, by the downward flow of the much heavier filtration sand. This sand is returned by gravity to the filter bed after it has been scrubbed clean.

A hood 60, with a downwardly inclined conical surface 61, is positioned immediately above the screen filtrate enclosure. As filtration material 22 is withdrawn by the air lift tube 36, a portion of the filtration material 20 in bed 18 moves downward to contact the downwardly inclined edges 61 of hood 60.

The bottom end 62 of the air lift tube 36 is conically or bell-shaped. This bell-shaped bottom end increases the pumping rate, so that more sand and dirt can be pumped with the same compressed air requirements. Also, the bell-bottom configuration allows for easier restart of the air lift after it has been turned off.

Although the invention has been described with reference to a set of specific exemplary embodiments, it is to be understood that many modifications, variations and equivalents are possible within the spirit and scope of the invention or as defined in the appended claims.

What is claimed is:

1. A liquid filtering apparatus comprising:
   a vessel;
   a bed of filtration material within said vessel, said bed comprising particles of different sizes, including large particles and fine particles, said bed having a generally conical configuration;
   an intake for introducing into an upper region of the vessel a liquid to be filtered, said liquid being filtered by gravitationally descending through the bed to a lower region of the vessel;
   an enclosure in said bed for collecting said filtered liquid in the lower region of the vessel;
   an outlet for removing said filtered liquid from the enclosure;
   an air lifting tube for conveying a mixture of filtration material dirtied by particulates taken from the liquid undergoing filtration and a small amount of said filtered liquid from the lower region of the vessel to the upper region of the vessel;
   a hollow bell-bottom shaped intake at a lower end of the air lifting tube;
   a washbox at the upper region of the vessel, said air lifting tube conveying the filtration material and the small amount of filtered liquid from the lower region of the vessel to the washbox;
   a washed filtration material conveying tube communicating with the washbox and the upper region of the bed, wherein the washed filtration material is introduced to the upper region of the bed, thereby acquiring and retaining its generally conical configuration; and
   a gas introducing interface connected to the air lifting tube for introducing a compressed gas into the air lifting tube to increase flow of the dirtied filtration material to the washbox.

2. The liquid filtering apparatus of claim 1, wherein the large particles and small particles are particles of sand.

3. The liquid filtering apparatus of claim 1, wherein the liquid is water/wastewater.

4. A liquid filtering apparatus according to claim 1, wherein the interface is defined by a ring having at least one passageway communicating to the air lifting tube, the ring having an inlet adapted for connecting to a compressed gas source.

5. A liquid filtering apparatus according to claim 4, wherein the ring has two passageways separated by 180° from each other and two inlets adapted for connecting to the compressed gas source.

6. A liquid filtering apparatus according to claim 5, wherein the two inlets are adapted for connecting to two separate compressed gas sources, each connecting to one of the two inlets, wherein each gas source may be turned off or adjusted independently of the state of the other.

7. A liquid filtering apparatus according to claim 5, wherein the ring is positioned between the bell-bottom shaped intake and the enclosure.

8. A liquid filtering apparatus according to claim 1, wherein the washbox includes a flat round target plate against which the mixture is impacted so that the resulting agitation washes the dirt particulates from the dirtied filtration material.

9. A liquid filtering apparatus according to claim 8, wherein the washbox further includes an arc-shaped vertical baffle for preventing ejection of the washed filtration material from the washbox.

10. A liquid filtering apparatus according to claim 9, wherein the vertical baffle is formed with an arc of about 120°.

11. A liquid filtering apparatus according to claim 1, wherein the washed filtration material conveying tube is concentric around the air lifting tube.

12. A liquid filtering apparatus according to claim 1, wherein the interface is positioned between the bell-bottom shaped intake and the enclosure.

* * * * *